United States Patent [19]

Bossel

[11] Patent Number: 5,079,105
[45] Date of Patent: Jan. 7, 1992

[54] DEVICE FOR CONVERSION OF CHEMICAL ENERGY FROM HYDROCARBONS INTO ELECTRIC ENERGY BY AN ELECTROCHEMICAL HIGH-TEMPERATURE PROCESS

[75] Inventor: Ulf Bossel, Baden

[73] Assignee: Asea Brown Boveri Ltd., Baden, Switzerland

[21] Appl. No.: 524,459

[22] Filed: May 17, 1990

[30] Foreign Application Priority Data

May 18, 1989 [CH] Switzerland ............ 1860/89-2

[51] Int. Cl.$^5$ .................. H01M 8/06; H01M 8/12
[52] U.S. Cl. .................................. 429/19; 429/32
[58] Field of Search .................. 429/19, 30, 32

[56] References Cited

U.S. PATENT DOCUMENTS

| | | | |
|---|---|---|---|
| 3,472,697 | 10/1969 | Sandstede et al. ............ | 429/32 |
| 3,718,506 | 2/1973 | Fischer et al. | |
| 4,395,468 | 7/1983 | Isenberg ................... | 429/31 |
| 4,692,274 | 9/1987 | Isenberg et al. ............ | 252/521 |
| 4,877,693 | 10/1989 | Baker ...................... | 429/19 |
| 4,910,100 | 3/1990 | Nakanshi et al. ........... | 429/32 |

FOREIGN PATENT DOCUMENTS 266861 5/1988 European Pat. Off. .

OTHER PUBLICATIONS

Fischer et al., *Chemie-Ing.-Techn.*, vol. 44, No. 11, pp. 726-732; 6/72 "Hochtemperatur Brennstoffzellen mit Keramischen Electrolyten zur Umsetzung B Billiger Brennstoffe",.

"Electrolyten zur Umsetzung Billiger Brennstoffe" Antonsen et al., *Brown Boveri Mitteilungen* Jan.-Feb. 1966, "Hochtemperatur Brennstoffbatterie mit Keramischen Electrolyten".

Dollard et al., "An Overview of the Westinghouse Electric Corporation Solid Oxide Fuel Cell Program, *Fuel Cell Technology and Applications Extended Abstracts*" 10/26-29/ 87 (Seminar).

Rohr; *Solid Electrolytes*, 1978, Academic Press, pp. 431-450, Chapter 25: "High Temperature Fuel Cells".

Fee et al., "Monolithic Fuel Cell Development" Paper Presented at the Fuel Cell Seminar, 10/26-29/86, at Tuscon, Arizona.

*Primary Examiner*—Kalafut, Stephen J.
*Attorney, Agent, or Firm*—Oblon, Spivak, McClelland, Maier, Neustadt

[57] ABSTRACT

Device for the conversion of chemical energy of hydrocarbons into electric energy by plate-shaped high-temperature fuel cells, arranged like a stack around a central reaction space, on the basis of zirconium oxide as solid electrolyte, wherein gas jet pumps are provided for the transport and mixing of a part of the $O_2$ excess and ballast gas with the gaseous oxygen carrier, as well as for the transport and mixing of a part of the fuel excess and the reaction products with the gaseous fuel, and a central perforated feed pipe and a perforated body with catalyst coating are provided such that endothermic conversion reactions are performed within the central reaction space.

5 Claims, 3 Drawing Sheets

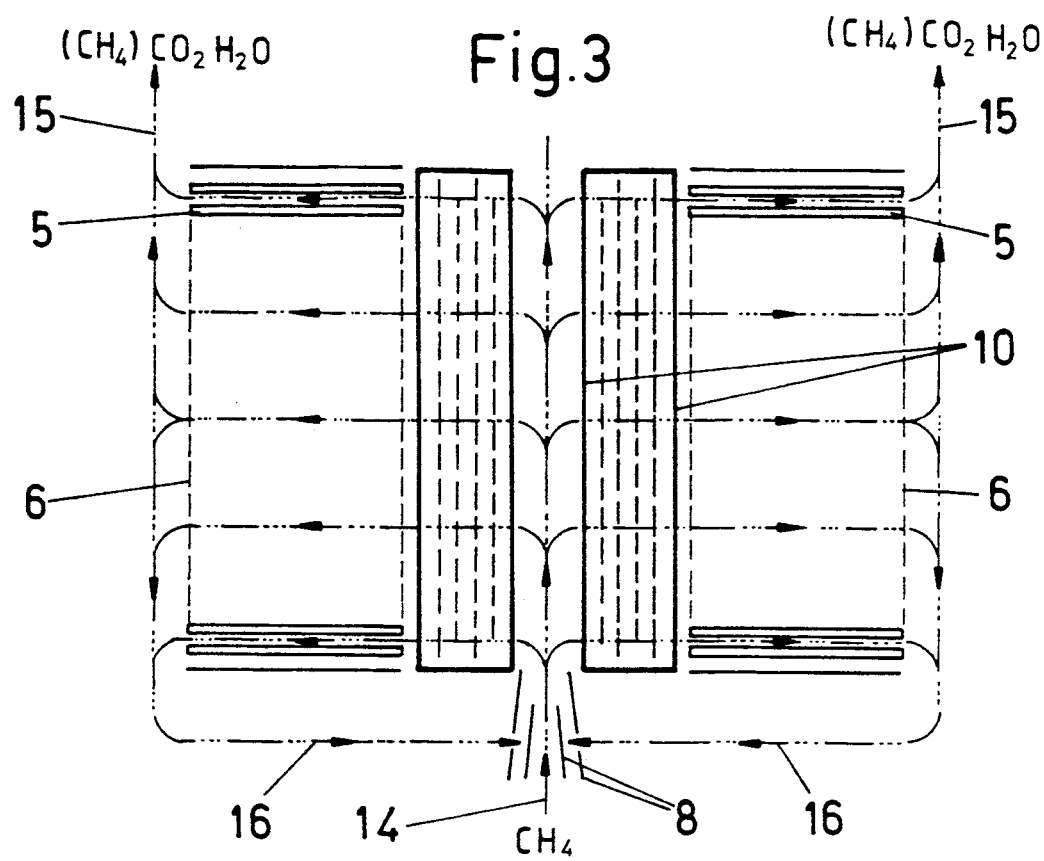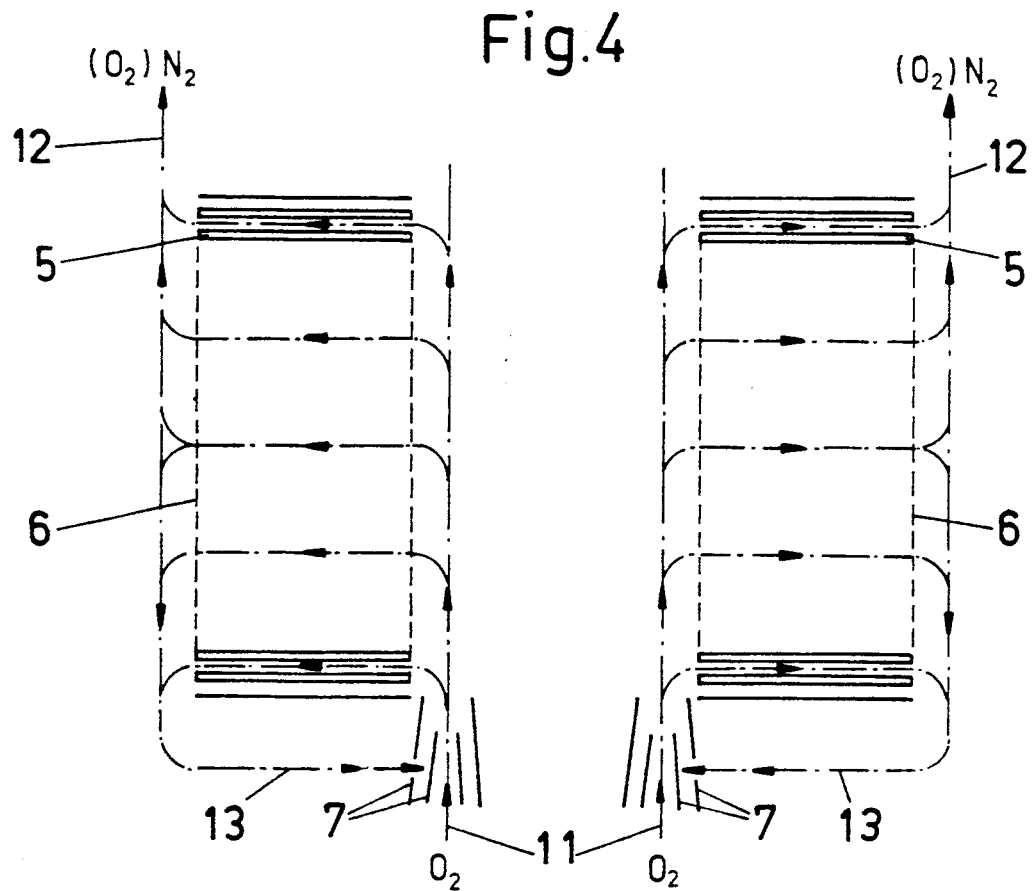

DEVICE FOR CONVERSION OF CHEMICAL ENERGY FROM HYDROCARBONS INTO ELECTRIC ENERGY BY AN ELECTROCHEMICAL HIGH-TEMPERATURE PROCESS

BACKGROUND OF THE INVENTION

1. Field of the Invention

High-temperature fuel cells are utilized for the conversion of chemical energy into electric energy. Devices for electrochemical energy conversion gain importance thanks to their simple handling and their high efficiency.

The present invention relates to the further development of the electrochemical high-temperature cells with the use of ceramic solid electrolytes as ion conductors, and the device is to be largely independent of the fuel used.

The invention further relates to a device for the conversion of chemical energy into electric energy by an electrochemical high-temperature process by use of flat, plane ceramic fuel cells, arranged like a stack, on the basis of zirconium oxide as solid electrolyte, and each fuel cell is acted on, on the one side, by the gaseous oxygen carrier and, on the other side, by gaseous fuel.

2. Description of the Related Art

Electrochemical units for the conversion of the chemical energy, contained in a gaseous fuel, into electric energy are known. The fuel cells made so far work mainly with hydrogen or carbon monoxide, optionally with a mixture of these two fuels. If hydrocarbons such as, for example, methane (main component of natural gas) are available, they are generally first converted by a conversion process into a mixture of hydrogen and carbon monoxide. Since these processes proceed endothermally, they are connected with a considerable outside heat consumption. For this purpose, separate conversion units are generally operated and the heat requirement is covered by combustion of a part of the gaseous fuel. For this purpose, additional preparation units for steam or carbon dioxide are necessary.

In the related art, the following publications are named:

O. Antonsen, W. Baukal and W. Fischer, "High-temperature Fuel Battery with ceramic electrolytes," Brown Boveri Mitteilungen [information] January/February 1966, pp. 21–30, U.S. Pat. No. 4,692,274

U.S. Pat. No. 4,395,468

W. J. Dollard and W. G. Parker, "An Overview of the Westinghouse Electric Corporation solid oxide fuel cell program," Extended Abstracts, Fuel Cell Technology and Applications, International Seminar, The Hague, the Netherlands, Oct. 26–29, 1987, F. J. Rohr, High-Temperature Fuel Cells, Solid Electrolytes, 1978 by Academic Press, Inc., p. 431 ff.

D. C. Fee et al., Monolithic Fuel Cell Development, Argonne National Laboratory, Paper presented at the 1986 Fuel Cell Seminar, Oct. 26–29, 1986, Tucson, Ariz., U.S. Department of Energy, the University of Chicago.

The known devices necessary for conversion of primary fuels, especially of hydrocarbons, into more suitable gaseous fuels (H2 and CO) are expensive and require additional delivery means and control elements (pumps, valves, etc.). Also such an operation requires an additional fuel consumption, by which the efficiency is reduced.

The designs known so far of ceramic fuel cells and cell batteries leave much to be desired in regard to unit volume, power and efficiency as well as guiding the current of gaseous media. Therefore, there is a great demand to improve fuel cells and their arrangement in design and operational respect.

SUMMARY OF THE INVENTION

Accordingly, an object of this invention is to provide for a novel device for conversion of chemical energy of hydrocarbons into electric energy by an electrochemical high-temperature process by use of ceramic fuel cells on the basis of zirconium oxide as solid electrolyte, which exhibits the highest possible efficiency with the optimal use of the heat accumulating in the process and possibly without outside heat input by the use of endothermic conversion reactions. The device is to have a simple design and is to exhibit no additional expensive equipment. In addition, the device is to be easy to manage in operation and requires no complicated devices for temperature and power control.

This object is achieved in that in the initially mentioned device at least one gas jet pump per individual stack of fuel cells for the transport and mixing of a part of the $O_2$ excess and ballast gas with the gaseous oxygen carrier is provided, the stack of fuel cells are arranged around a central reaction space, and a central gas jet pump for the transport and for mixing a part of the fuel excess and of the gaseous reaction products $CO_2$ and $H_2O$ with the gaseous fuel is provided, and a central perforated feed pipe for the gaseous fuel extends into the central reaction space, wherein the following endothermic conversion reactions occur in the central reaction space:

$$CH_4 + CO_2 \rightarrow 2\,CO + 2H_2 \text{ and}$$

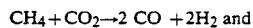

$$C_4 + H_2O \rightarrow CO + 3H_2$$

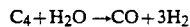

The basic idea of the invention consists in gas jet pumps being used for the circulating gaseous media. Further, the Joule heat accumulating in the fuel cell by ohmic losses is to be used as much as possible for covering the enthalpy requirement in the performance of purposeful endothermic chemical reactions (conversion).

Accordingly, the present invention relates to a device for the conversion of chemical energy of hydrocarbons into electric energy by an electrochemical high-temperature process, on the basis of zirconium oxide as a solid electrolyte, said device comprising: a plurality of flat ceramic fuel cells arranged in a plurality of stacks around a central reaction space, each of the fuel cells being acted on one side by a gaseous oxygen carrier and being acted on the other side by a gaseous fuel; at least one gas jet pump per individual stack of fuel cells for transporting and mixing a part of an $O_2$ excess and ballast gas with the gaseous oxygen carrier; a central gas jet pump for transporting and mixing a part of a fuel excess and gaseous reaction products $CO_2$ and $H_2O$ with the gaseous fuel; and a central perforated feed pipe for the gaseous fuel extending into the reaction space, wherein the following occur endothermic conversion reactions occur in the central reaction space:

$$CH_4 + CO_2 \rightarrow 2\,CO + 2H_2 \text{ and}$$

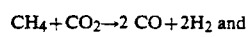

$$CH_4 + H_2O \rightarrow CO + 3H_2$$

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 3 shows a diagrammatic longitudinal section (vertical projection) through a device consisting of fuel cells, arranged like a stack, with the flow pattern of the circuit of the gaseous fuel; and FIG. 4 shows a diagrammatic longitudinal section (horizontal projection) through a device consisting of fuel cells, arranged like a stack, with the flow pattern of the circuit of the gaseous oxygen carrier.

DESCRIPTION OF THE PREFERRED EMBODIMENTS

Figure 1:
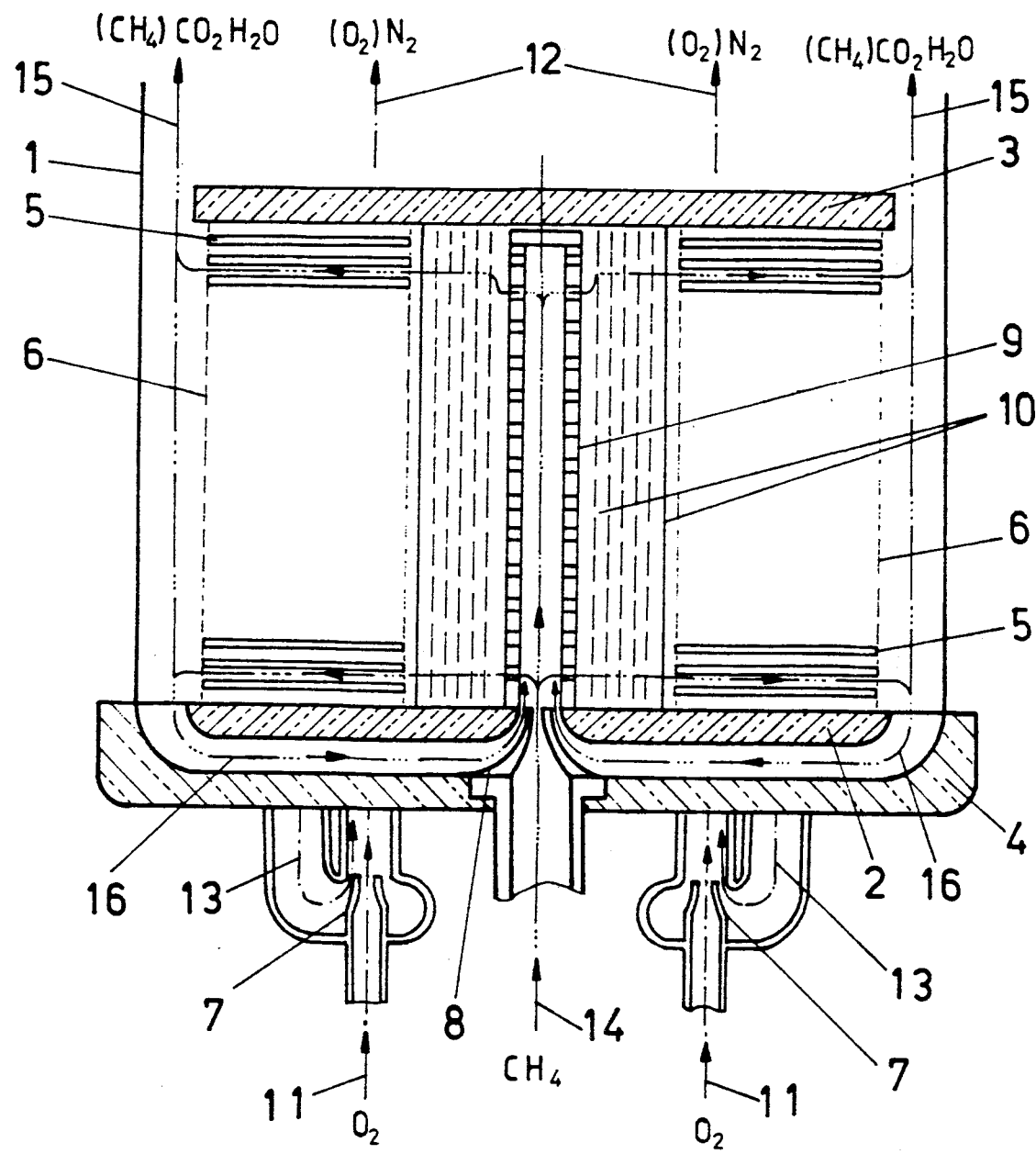
FIG. 1 shows a vertical projection (longitudinal section) through a device consisting of fuel cells, arranged like a stack, with gas jet pumps and a central body with catalyst.

In FIG. 1 a vertical projection (longitudinal section) through a device consisting of fuel cells, arranged like a stack, with gas jet pumps and a central body with a catalyst is represented. 1 is the heat-insulated container (insulation not shown), in which the active parts of the device are placed, 2 is the lower closing plate and 3 is the upper closing plate of container 1. Plates 2 and 3 preferably consist of ceramic material. 4 is the bottom of the device, which advantageously is also made of ceramic and 5 represents an individual fuel cell. The total stack, consisting of fuel cells and separation plates (limitation indicated by broken line) is indicated by 6. In the present case, there are four stacks 6 placed centrosymmetrically around the center line of the device (FIG. 2) to define a central reaction space, two of which can be seen in vertical projection. 7 is a gas jet pump for the gaseous oxygen carrier ($O_2$ or air), which provides for the mixing of the latter with the $O_2$ excess (residual oxygen) and the ballast gas (nitrogen), if present, as well as the transport of the resulting mixture of the gaseous media to fuel cells 5. At least one gas jet pump 7 is present per stack 6. Two of them (one gas jet pump 7 per stack 6) are drawn in vertical projection. 8 is a gas jet pump for the gaseous fuel (for example, $CH_4$), which performs the mixing of the latter with the fuel excess (residual fuel) and the gaseous reaction products (carbon dioxide, steam) as well as the transport of the resulting gaseous mixture to fuel cells 5.

Feeding of the gaseous fuel to fuel cells 5 takes place by a central perforated feed pipe 9 for all stacks 6 together. 10 is a perforated body with catalyst coating for acceleration of the endothermic conversion reactions which occur at the central reaction space:

$$CH_4 + CO_2 \rightarrow 2\ CO + 2H_2 \text{ and}$$

$$CH_4 + H_2O \rightarrow CO + 3H_2$$

Body 10 is advantageously designed as a centrosymmetrical component with hollow cylindrical peripheries. Feeding of the gaseous oxygen carrier to gas jet pump 7 is indicated by arrow 11 and symbol $O_2$. Arrows 12 indicate the removal of the $O_2$ excess and of the ballast gas (nitrogen), symbol $(O_2)N_2$. A part of the latter gas mixture is fed to gas jet pump 7. This recycling is indicated by 13. 14 is the central feed of the gaseous fuel (in the present case, methane): symbol $CH_4$. The gaseous mixture, consisting of residual fuel and reaction products, collects in the annular space between container 1 and stack 6. The removal of fuel excess and gaseous reaction products (carbon dioxide, steam) is indicated by arrow 15: symbol $(CH_4)\ CO_2\ H_2O$. 16 is the recycling of the fuel excess and the gaseous reaction products to central gas jet pump 8.

Figure 2:
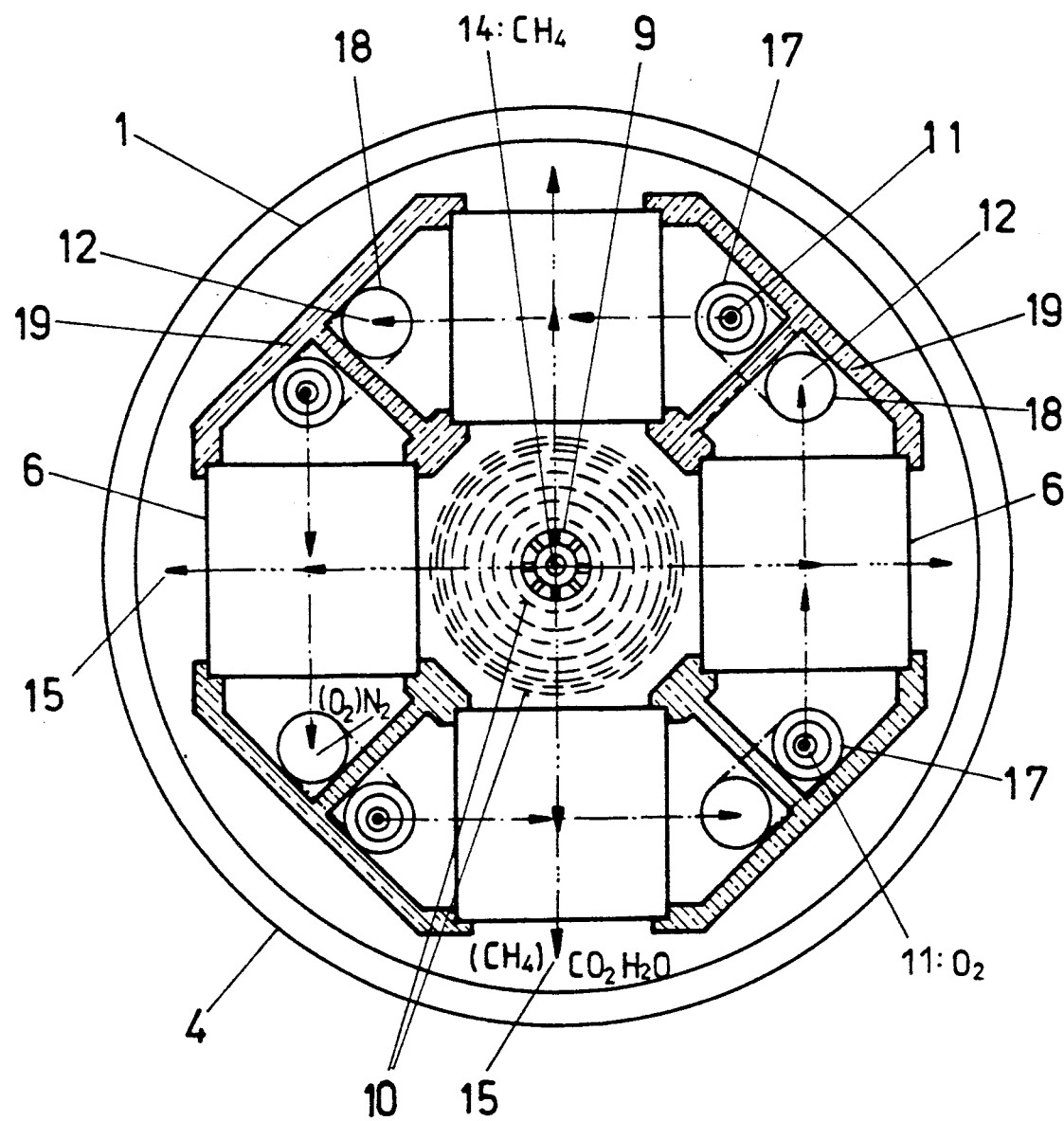
FIG. 2 shows a horizontal projection (cross section) through a device consisting of fuel cells, arranged like a stack, and a central body with catalyst.

FIG. 2 relates to a horizontal projection (cross section) through a device consisting of fuel cells, arranged like a stack, and central body with catalyst. 1 is the heat-insulated container, 4 is the bottom of the device. 6 is a stack each of fuel cells and separation plates. Four such stacks 6 with square cross section (horizontal projection) are present. Central perforated feed pipe 9 for the gaseous fuel can be seen in cross section (horizontal projection) and clearly shows the radial openings. Perforated hollow cylindrical body 10 with catalyst coating is placed concentrically to feed pipe 9. Feeding 11 of the gaseous oxygen carrier (symbol $O_2$) takes place perpendicular to the drawing plane and coming out from the latter. This is indicated by a double ring with dot in the cross section of feed pipe 17. Removal 12 of the $O_2$ excess and of the ballast gas ($N_2$) takes place partially coming from the drawing plane, partially going into it. This is performed by discharge pipe 18, whose longitudinal pipe is perpendicular to the plate plane (drawing plane). Feeding 14 of the gaseous fuel (symbol $CH_4$) takes place perpendicular to the drawing plane and coming out from it. This is indicated by a ring with dot in the cross section of central feed pipe 9. Removal 15 of the fuel excess and of the gaseous reaction products ($CO_2$, $H_2O$) takes place partially coming from the drawing plane, partially going into it. 19 is a strip-shaped ceramic body with T-shaped profile. Bodies 19, with stacks 6, form a mechanically stable composite structure. Pipes 17 and 18 are each in a recess formed in the T-shaped profile of body 19.

In FIG. 3, there is represented a diagrammatic longitudinal section (vertical projection) through a device consisting of fuel cells, arranged like a stack, with the flow pattern of the circuit of the gaseous fuel. The reference designations are the same as indicated in FIG. 1. So as not to adversely affect the clarity, only the active parts fuel cells 5, stack 6, gas jet pump 8 and body 10 with catalyst coating are represented. Feeding 14 of the gaseous fuel ($CH_4$) takes place by the central nozzle of gas jet pump 8, which sucks in a part of the fuel excess and of the gaseous reaction products: recycling 16. Body 10 and stack 6 are flowed through radially. The remaining part of the fuel excess and of the reaction products flows upward: removal 15: symbol $(CH_4)\ CO_2\ H_2O$.

FIG. 4 shows a diagrammatic longitudinal section (vertical projection) through a device consisting of fuel cells, arranged like a stack, with the flow pattern of the circuit of the gaseous oxygen carrier. The reference designations are the same as indicated in FIG. 1. Per stack 6 one gas jet pump 7 each is present, which is operated with the oxygen carrier (feeding 11, symbol $O_2$). Gas jet pump 7 sucks in a part of the $O_2$ excess and of the ballast gas (in the present case $N_2$) recycling 13. Each stack 6 is flowed through tangentially relative to the centrosymmetrical arrangement of several stacks. The remaining part of the $O_2$ excess and of the ballast gas flows upward: removal 12: symbol $(O_2)N_2$.

EMBODIMENT EXAMPLE 1

See FIGS. 1 and 2;

The device comprises a heat-insulated container 1 of 200 mm inside diameter of corrosion-resistant high-temperature Cr/Ni steel, in which 4 stacks 6 of fuel cells and separation plates were arranged in a cross. Another cylinder of 230 mm outside diameter was placed concentrically to container 1 (not shown in FIGS. 1 and 2), so that an annular gap of about 10 mm radial width was formed. The gaseous oxygen carrier (air) was directed through this annular gap for preheating to about 400° C. The individual ceramic fuel cells on the basis of doped $ZrO_2$ as solid electrolyte had a square area of 50 mm lateral length. The entire stack 6 had a height of 300 mm. 4 such stacks 6 each were laterally fixed by strip-shaped ceramic bodies 19 with T-shaped profile, consisting of sintered $Al_2O_3$, and were held together by axial anchorings between upper closing plate 3 and lower closing plate 2 or bottom 4. Feed pipes 17 for the air and discharge pipes 18a for the air excess ($O_2$ excess+ballast gas $N_2$) were placed in the corners of the hollow spaces of strip-shaped bodies 19. The entire block, comprising stacks 6 and bodies 19, thus had, in horizontal projection (cross section), the form of an octagon. Central perforated feed pipe 9 for the gaseous fuel was in the center line of the device. The feed pipe 9 comprising a ceramic material was surrounded by a number of coaxially arranged cylinders of nickel wire braiding. This perforated body 10 acted as catalyst for acceleration of the endothermic reactions:

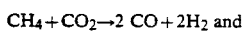

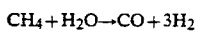

Gas jet pump 8 (ejector) for gaseous fuel $CH_4$ was placed in the central area of lower closing plate 2 and of bottom 4. Gas jet pump 8 was used for partial recycling 16 of the fuel excess and of the gaseous reaction products ($CO_2$ and $H_2O$) from the space of removal 15. For this purpose radial ducts were provided in the area of bottom 4 of the device. The air, preheated on the wall of heat-insulated container 1, was fed with excess pressure to gas jet pumps 7. Per stack 6 a gas jet pump 7 (ejector) each was provided, which was used for partial recycling 13 of the $O_2$ excess and ballast gas $N_2$.

The device was operated so that feeding 14 of gaseous fuel $CH_4$ took place with a pressure of about 3 bars. In this case, the fuel was previously preheated before to about 500° C. The amount of recycling 16 of the fuel excess and of the gaseous reaction products was about 3 times that of feeding 14, and the recycled gaseous medium exhibited a temperature of about 900° C. The mixed gas current consequently had an average temperature of about 800° C. Feeding 11 of the gaseous oxygen carrier air of 400° C. took place with a pressure of about 2 bars. The amount of recycling 13 of $O_2$ excess and of ballast gas $N_2$ was about 2.5 times that of feeding 11, and the recycled gaseous medium exhibited a temperature of about 900° C. The resulting mixed gas (air mixture) thus had a temperature of about 750° C.

EMBODIMENT EXAMPLE 2

The device was basically designed as under Example 1. The measurements and arrangements of stacks 6 of fuel cells and separation plates were the same. But in contrast with FIG. 2, now only 2 feed pipes 17 for the gaseous oxygen carrier (air) were present, which were each placed diagonally opposite in a somewhat differently designed ceramic body 19. In this way, two adjacent stacks 6 were fed by one feed pipe 17 each. The two discharge pipes 18 for $O_2$ excess and ballast gas $N_2$ were on the diagonals, offset by 90°, in one recess each of ceramic body 19. Basically nothing was changed in the crosscurrent principle between oxygen carrier and fuel according to FIG. 2. Only the direction of the current of the oxygen carrier is exactly reversed in two stacks 6.

The device was operated according to the parameters under Example 1. The device provided about 1.2 kW at an operating temperature of 900° C. The fuel utilization was about 90%. The efficiency was determined at 52%.

The invention is not limited to the embodiment examples.

The device for the conversion of chemical energy of hydrocarbons into electric energy by a electrochemical high-temperature process consists of flat, plane ceramic fuel cells 5, arranged like a stack around a central reaction space, on the basis of zirconium oxide as solid electrolyte, by each fuel cell 5 being acted on, on the one side, by the gaseous oxygen carrier and, on the other side, by gaseous fuel, and for transport and mixing of a part of the $O_2$ excess and ballast gas with the gaseous oxygen carrier at least one gas jet pump 7 per individual stack 6 of fuel cells 5 and for transport and mixing a part of the fuel excess and of the gaseous reaction products $CO_2$ and $H_2O$ with the gaseous fuel a central gas jet pump 8 is provided and a central perforated feed pipe 9 for the gaseous fuel extends into the central reaction space where the following endothermic conversion reactions occur:

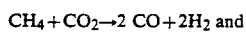

Preferably 4 individual stacks 6 of fuel cells 5 are placed in a heat-insulated container 1 symmetrically around a central perforated feed pipe 9 for the gaseous fuel and the intermediate space between feed pipe 9 and individual stacks 6 is filled with a perforated hollow cylindrical body 10, whose surface is coated with a catalyst accelerating the conversion reactions.

In a special embodiment of the device, per individual stack 6 for feeding 11 of the gaseous oxygen carrier at least one feed pipe 7, placed in the sector between two adjacent inductive stacks 6, and for removal 12 of the $O_2$ excess and the ballast gas at least one discharge pipe 18 placed adjacent are provided, and the axes of these pipes are perpendicular to the plate plane. In another embodiment of the device, between each two adjacent individual stacks 6 is placed a strip-shaped ceramic body 19 with a T-shaped cross-section with its longitudinal axis being perpendicular to the plate plane, in whose recesses both feed pipe 17 and discharge pipe 18 are placed, and the entire active part of the device consisting of several individual stacks 6, is held together by ceramic body 19.

Obviously, numerous modifications and variations of the present invention are possible in light of the above teachings. It is therefore to be understood that within the scope of the appended claims, the invention may be practice otherwise than as specifically described herein.

What is claimed as new and desired to be secured by Letters Patent of the United States is:

1. Device for the conversion of chemical energy of hydrocarbons into electric energy by an electrochemical high-temperature process, on the basis of zirconium oxide as a solid electrolyte, said device comprising:

a plurality of flat ceramic fuel cells arranged in a plurality of stacks around a central reaction space, wherein the endothermic conversion reactions:

$$CH_4 + CO_2 \rightarrow 2CO + 2H_2 \text{ and}$$

$$CH_4 + H_2O \rightarrow CO + 3H_2$$

are performed; each of said fuel cells being acted on one side by a gaseous oxygen carrier and being acted on the other side by a gaseous fuel;

at least one gas jet pump per each individual stack of fuel cells for transporting and mixing a part of an $O_2$ excess and ballast gas with the gaseous oxygen carrier;

a central gas jet pump for transporting and mixing a part of a fuel excess and gaseous reaction products $CO_2$ and $H_2O$ with the gaseous fuel; and a central perforated feed pipe for the gaseous fuel, said central perforated feed pipe extending into said reaction space.

2. Device according to claim 1, wherein four individual stacks of said fuel cells are positioned in a heat-insulated container symmetrically around said central reaction space with said central perforated feed pipe for the gaseous fuel; and wherein an intermediate space between said fee pipe and said individual stacks is filled with a perforated hollow cylindrical body, whose surface is coated with a catalyst accelerating the conversion reactions.

3. Device according to claim 2, wherein at least one feed pipe for feeding the gaseous oxygen carrier is positioned in a sector between two adjacent individual stacks, and wherein at least one discharge pipe for the removal of the $O_2$ excess and the ballast gas is positioned adjacent to said feed pipe.

4. Device according to claim 3, wherein a strip-shaped ceramic body having a T-shaped angular profile is located between two adjacent individual stacks, said strip-shaped ceramic body comprising recesses in which said feed pipe and said discharge pipe are respectively positioned, wherein an active part of said device comprising several individual stacks is held together by said ceramic bodies.

5. Device according to claim 4, wherein a longitudinal axis of said ceramic body and axes of said feed pipe and said discharge pipe are perpendicular to a horizontal plane of said device.

* * * * *